United States Patent [19]

Siglow

[11] 4,132,867
[45] Jan. 2, 1979

[54] PROCESS FOR THE FRAME SYNCHRONIZATION OF A TIME DIVISION MULTIPLEX SYSTEM

[75] Inventor: Joachim Siglow, Wolfratshausen, Fed. Rep. of Germany

[73] Assignee: Siemens Aktiengesellschaft, Munich, Fed. Rep. of Germany

[21] Appl. No.: 837,184

[22] Filed: Sep. 28, 1977

[30] Foreign Application Priority Data

Dec. 17, 1976 [DE] Fed. Rep. of Germany ....... 2657365

[51] Int. Cl.² .............................................. H04J 3/06
[52] U.S. Cl. ................................................. 179/15 BS
[58] Field of Search ...................... 179/15 BS, 15 BA; 178/69.1

[56] References Cited

U.S. PATENT DOCUMENTS 3,985,961  10/1976  Voss ................................. 179/15 BS Primary Examiner—Kathleen H. Claffy
Assistant Examiner—Joseph A. Popek
Attorney, Agent, or Firm—Schuyler, Birch, Swindler, McKie & Beckett

[57] ABSTRACT

A synchronization system for a time division multiplex system. Only a single synchronizing bit for each multiplex frame is transmitted, thereby reducing to a minimum the use of channel transmission capacity for synchronization purposes. Nevertheless, a synchronizing word consists of a number of successive synchronizing bits and a plurality of synchronizing words are employed in the synchronization process, so that a substantial degree of insensitivity to errors in synchronization is achieved.

4 Claims, 6 Drawing Figures

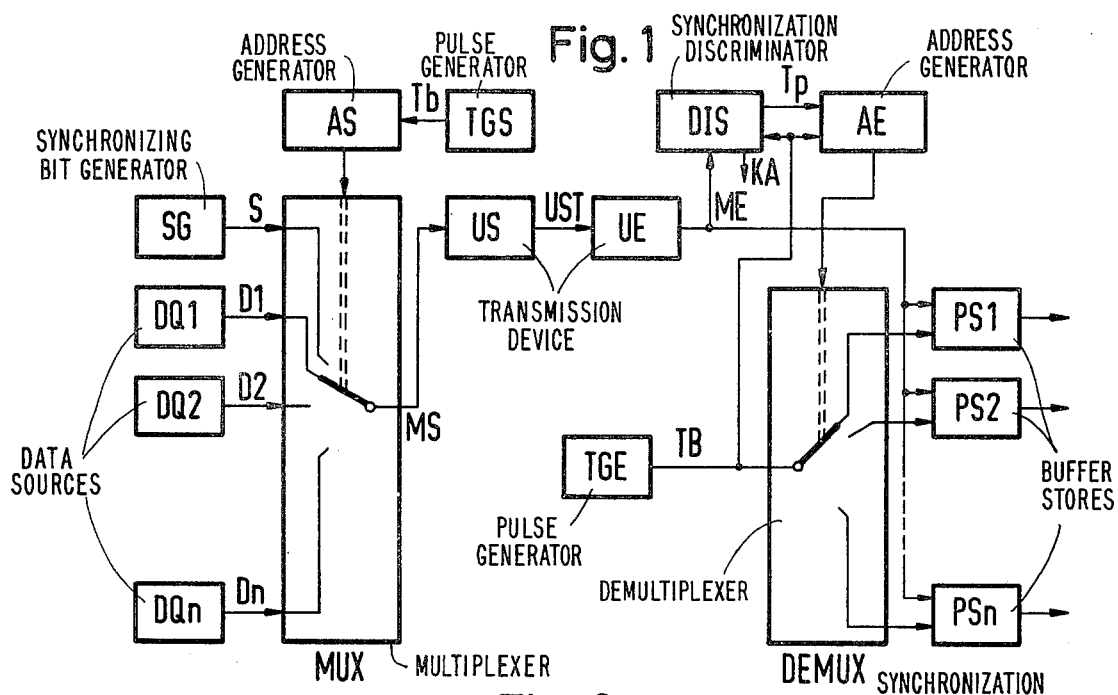
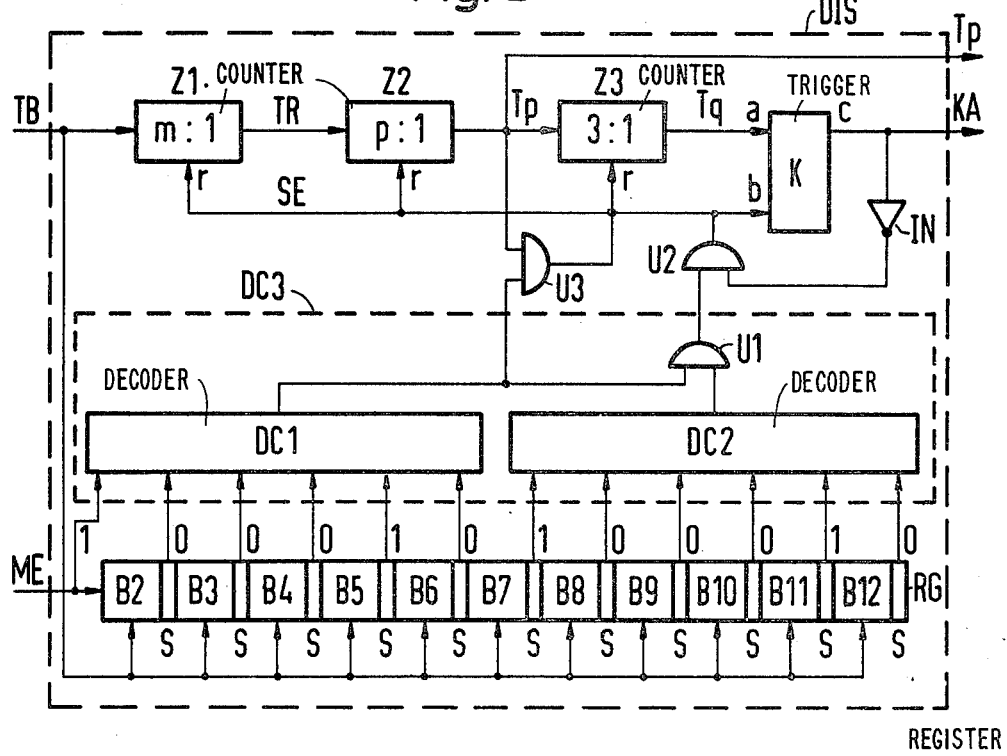

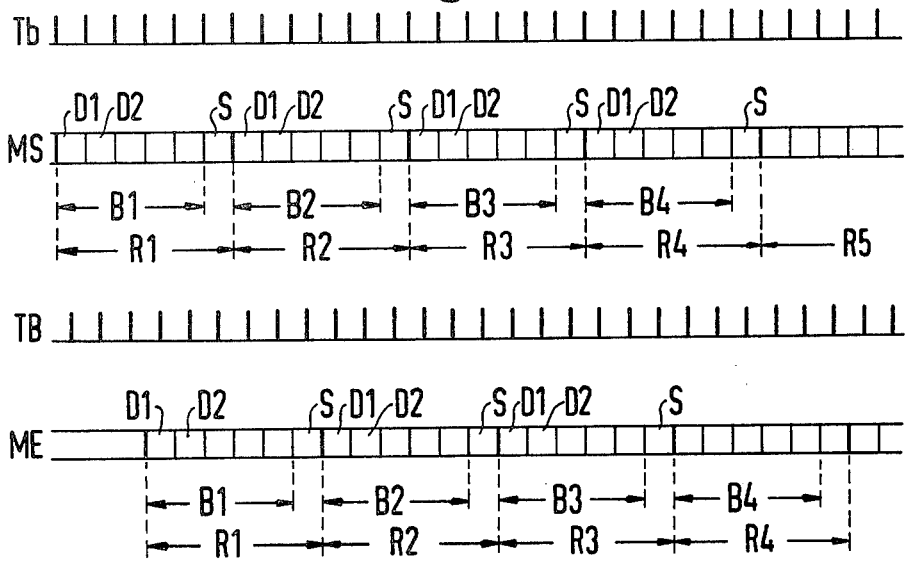
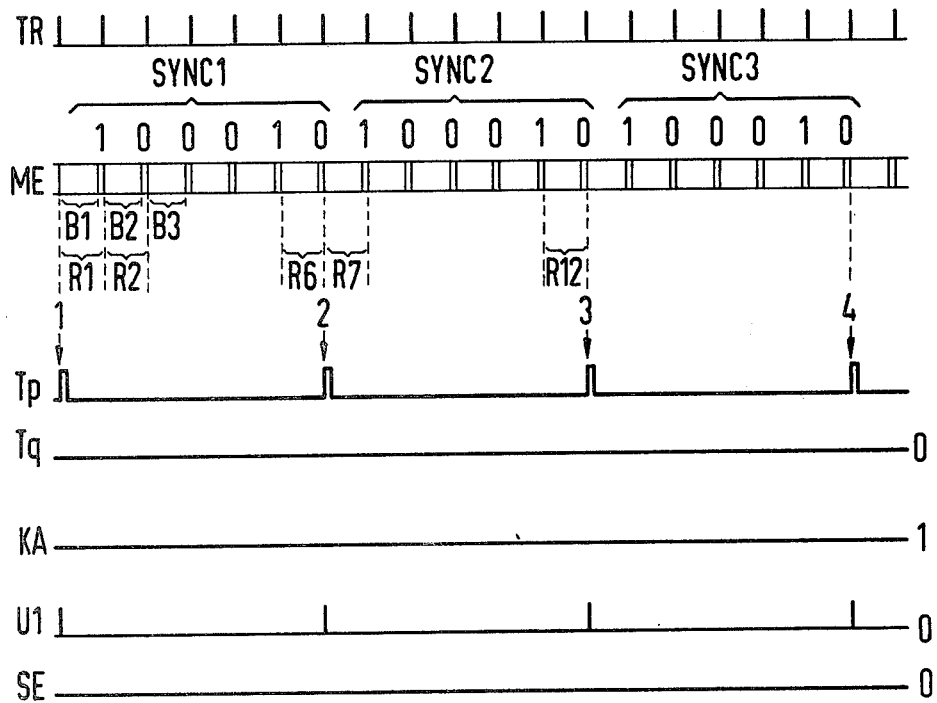

PROCESS FOR THE FRAME SYNCHRONIZATION OF A TIME DIVISION MULTIPLEX SYSTEM

BACKGROUND OF THE INVENTION

The invention relates to a process for the synchronization of a time division multiplex (t.d.m.) system having a plurality of data channels, with a multiplexer which makes available a total of m time slots per t.d.m. frame, and emits a multiplex signal; with a transmitting-end synchronizing bit generator which produces synchronizing bits which are transmitted in the frame of the multiplex signal from the transmitting-end to the receiving-end; with a receiving-end pulse generator for the production of a bit pulse train; with a receiving-end address generator for the operation of a demultiplexer; and with a receiving-end synchronizing discriminator which, with the aid of the synchronizing bits, produces a synchronizing signal for the operation of the address generator.

The same synchronization of t.d.m. systems is carried out, as is known, by transmitting, in each t.d.m. frame, a plurality of synchronizing bits which together form a synchronizing word. By receiving-end decoding of this synchronizing word, the position of the t.d.m. frame is recognized and a t.d.m. frame synchronization is facilitated. If the synchronizing words are formed only from a relatively small number of synchronizing bits, the probability of simulation of synchronizing features by data words is relatively great, so that frequently systems of this type are subject to interference. If, in contrast, the synchronizing words are formed from a plurality of individual synchronizing bits, the simulation of synchronizing features by data bits is low, although a relatively large proportion of the channel transmission capacity is needed for the transmission of the synchronizing information. Synchronizing words of this type, which consist of a plurality of synchronizing bits, also have the disadvantage that during the course of the synchronization monitoring, in the event of a breakdown in the synchronization, an alarm signal can only be produced with a relatively long delay.

The aim of the invention is to provide a process for frame synchronization which, in spite of insensitivity to simulation of synchronizing features, necessitates only a relatively low channel transmission capacity and which facilitates a rapid alarm triggering during the course of the synchronization monitoring in the event of a breakdown in the synchronization.

SUMMARY OF THE INVENTION

The aim on which the invention is based is realized by the application of the following steps:

A. In respect of each t.d.m. frame, the synchronizing bit generator produces precisely one synchronizing bit, and at least p ≧ six consecutive synchronizing bits form one synchronizing word.

B. The synchronizing bits of the synchronizing bit generator are fed at the transmitting-end via a data channel to the multiplexer.

C. At the receiving-end the multiplex signal is input with the bit pulse train in serial fashion into a register which consists of at least 2pm-m cells.

D. Each m-th cell of the register is connected to a first decoder and a second decoder, both of which respond to the synchronizing word and emit a first and second decoding signal respectively, and in the event of the coincidence of the first and second decoding signal a synchronization recognition signal is emitted.

E. When synchronization has not yet been reached, the synchronization recognition signal resets the count of a counter which, from a starting count, counts a further m.p counts and which emits the synchronizing signal to the address generator.

F. The synchronizing signal is fed to a synchronizing word counter which, in the event of the coincidence of the synchronizing signal with the first decoder signal, emits a resetting signal which resets the count of the synchronizing word counter and which emits a counting signal when a given count has been reached.

G. The counting signal is fed to a trigger stage which is controlled by the synchronizing word recognition signal and emits an alarm signal when the first decoding signal does not appear.

The process in accordance with the invention is characterized by a substantial degree of insensitivity to simulation of synchronizing features because on the one hand a plurality of consecutive synchronizing words are used for the synchronization process, and because on the other hand the individual synchronizing words consist of a relatively large number of individual synchronizing bits. In spite of this relatively extensive synchronizing information, only a small channel transmission capacity is required for the transmission of this synchronizing information, because only one single synchronizing bit is transmitted in each t.d.m. frame. The process in accordance with the invention is also characterized in that during the course of the synchronization monitoring, in the event of a synchronization disturbance, an alarm signal is rapidly formed because only one single synchronizing word, instead of two synchronizing words, needs to be decoded for this purpose.

In order to maintain the synchronization with a low technical outlay, for such time as the first decoder and the second decoder emit the first decoding signal and the second decoding signal respectively, employing a circuit arrangement for the execution of the process corresponding to the invention, it is expedient for the outputs of the first decoder and the second decoder to be connected to outputs of a first AND-gate, whose output is connected to an input of a second AND-gate; for the output of the trigger stage to be connected to a further input of the second AND-gate; and for the output of the second AND-gate to be connected on the one hand to an input of the trigger stage and on the other hand to a resetting input of the counter.

In order to monitor the synchronization with a low technical outlay, employing a circuit arrangement for the execution of the process, it is expedient for the output of the first decoder to be connected to an input of a third AND-gate; for the output of the counter to be connected to a second input of the third AND-gate; and for the output of the third AND-gate to be connected to a resetting input of the synchronizing word counter.

BRIEF DESCRIPTION OF THE DRAWINGS

In the following, exemplary embodiments of the invention will be described making reference to FIGS. 1 to 6, wherein identical components appearing in more than one Figure have been provided with like references.

FIG. 1 illustrates a t.d.m. system;

FIG. 2 is a more detailed illustration of a synchronization discriminator schematically illustrated in FIG. 1;

FIG. 3 shows a few signals which occur during the operation of the t.d.m. system represented in FIG. 1;

FIG. 4 shows a few signals which occur during the operation of the synchronization discriminator illustrated in FIG. 2, in the synchronous state;

DETAILED DESCRIPTION OF THE PREFERRED EMBODIMENT

Figure 5:
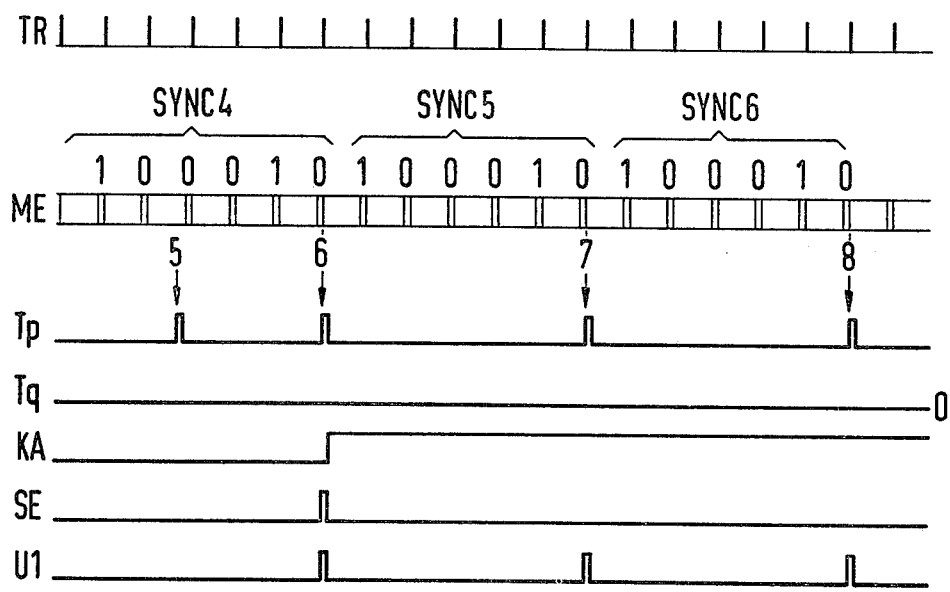
FIG. 5 shows a few signals which occur during the operation of the synchronization discriminator illustrated in FIG. 2 during the course of the frame synchronization hunting process; and, FIG. 6 illustrates a few signals which occur during the operation of the synchronization discriminator illustrated in FIG. 2, during the course of the synchronization monitoring.

FIG. 1 shows the synchronizing bit generator SG and the data sources DQ1, DQ2... DQn, whose outputs are connected via assigned data channels to inputs of the multiplexer MUX. Thus the signal S from the synchronizing bit generator is emitted via a first data channel and the data signals D1, D2... Dn are fed via further data channels to the multiplexer MUX. The signals S and D1, D2... Dn consist of sequences of individual bits from which, with the aid of the multiplexer MUX, the transmitting-end multiplex signal MS is formed which, in respect of each t.d.m. frame, is composed of at least one component of all the signals S, D1, D2... Dn. If the signals S, D1, D2... Dn are emitted with an equal bit rate, in each t.d.m. frame the t.d.m. signal MS contains one component of all the signals. However, the data signals D1, D2... Dn can also be emitted at different bit rates, so that in each t.d.m. frame a plurality of components of the individual data signals D1, D2... Dn form the t.d.m. signal MS. The multiplexer MUX is operated with the aid of the transmitting-end address generator AS, although no details will be given concerning the transfer of the individual signals S, D1, D2... Dn in respect of pulsing, as these details are known and lie outside of the scope of the present invention. For example, generally speaking, buffer stores are required in order to process the signals S, D1, D2... Dn at the correct time in the multiplexer MUX. It will be assumed that buffer stores of this type, where necessary, are arranged within the multiplexer MUX.

FIG. 3 illustrates the acquisition of the multiplex signal MS, where, for example, a total of six signals had been assumed to be provided, although in practice a larger number of channels will generally be provided. The bit pulse train Tb is produced by the pulse generator TGS represented in FIG. 1. In addition to the individual bits of the data signals D1, D2..., each t.d.m. frame R1, R2, R3, R4, R5 of the t.d.m. signal MS contains a synchronizing bit S. The bits B1, B2, B3, B4 of the individual data signals D1, D2... are each followed by a synchronizing bit S. The multiplex signal MS is transmitted across the transmission link UST with the aid of the transmitting-end transmission device US represented in FIG. 1, and is received by the receiving-end transmission device UE. The receiving-end pulse generator TGE produces the bit pulse train TB which is also shown in FIG. 3. The receiving-end multiplex signal ME is fundamentally identical to the transmitting-end t.d.m. signal MS, but occurs with a delay in relation to the latter.

The synchronization discriminator DIS represented in FIG. 1 is supplied with the t.d.m. signal ME, and the synchronizing signal Tp is obtained which serves to control the receiving-end address generator AE. The t.d.m. signal ME is fed to the buffer stores PS1, PS2 ... PSn, which are activated by the demultiplexer DEMUX and the bit pulse train TB. The basic function of the frame synchronization is to achieve frame synchronization between the transmitting-end multiplexer MUX and the receiving-end demultiplexer DEMUX, which is achieved by always resetting the address generator AE in such manner that the data signals D1, D2 ... Dn are intermediately stored in turn in the buffer stores PS1, PS2 ... PSn. The outputs of these buffer stores are connected to data terminal devices which have not been shown in FIG. 1.

Figure 6:
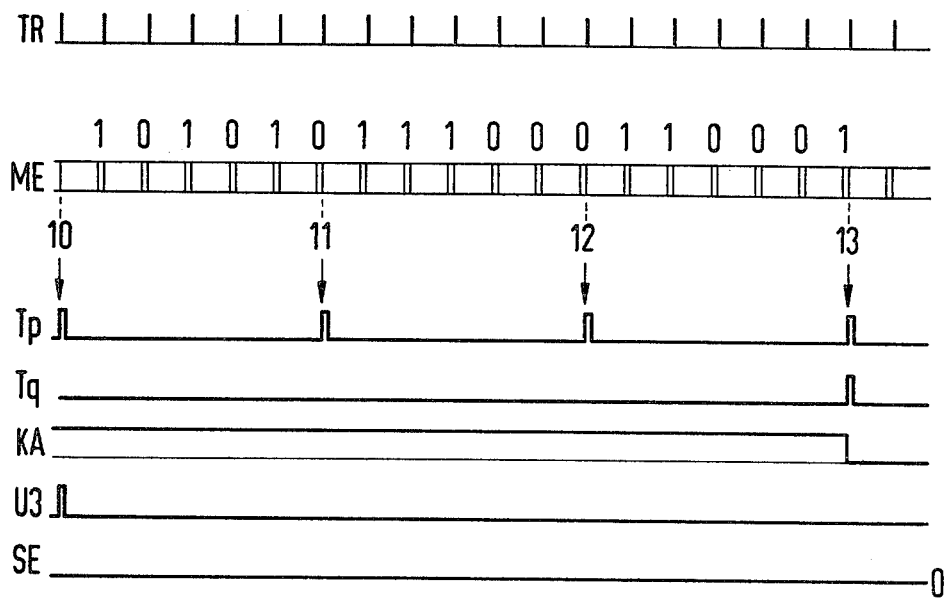

FIG. 2 is a more detailed illustration of the synchronization discriminator DIS schematically illustrated in FIG. 1. FIGS. 4, 5 and 6 show signals which occur during the operation of this synchronization discriminator. The receiving-end multiplex signal ME is fed in serial fashion to the register RG which is operated as a shift register, where the pulses of the bit pulse train TB are employed as a shift pulse train. The register RG contains the blocks B2, B3, B4, B5, B6, B7, B8, B9, B10, B11, B12 which are provided with the same references as the bits shown in FIG. 3, as these blocks serve to store the bits in question. The blocks B2 to B12 are each followed by a cell S which serves to store the synchronizing bits provided with the same references in FIG. 3. In this exemplary embodiment the individual blocks B2 to B12 each consist of six cells, whereas in a practical exemplary embodiment these blocks B2 to B12 will each consist of 46 cells, each followed by one cell S. Thus in this practical exemplary embodiment a total of 47 bits will be transmitted within the t.d.m. frame.

The decoders DC1 and DC2 both respond to the synchronizing word 100010 and, when the synchronizing words are recognized, each emit 1-signals. To enable the first synchronizing word to be recognized with the aid of the decoder DC1, only the blocks B2 to B6 and the corresponding cells S are required, as the t.d.m. signal ME is directly fed to the first input of the decoder DC1.

The bit pulse train TB is fed to the counter Z1 which after a total of m pulses emits an output pulse of the frame pulse train TR. Thus the t.d.m. signal has been assumed to possess a total of m time slots. In accordance with FIG. 3, it must be assumed that $m=6$, and in a practical exemplary embodiment a t.d.m. frame with $m=47$ contains a total of 47 time slots. The frame pulse train TR emitted via the output of the counter Z1 is illustrated in FIG. 4 which is on a larger scale than FIG. 3, as can be seen in particular by comparing the two multiplex signals ME illustrated in FIG. 3 and FIG. 4. The bits B1, B2, B3 ... of the multiplex signal ME are again followed by the synchronizing bits, so that from the time 1 to the time 2 the synchronizing word SYNC1 = 100010 is received. The synchronizing words SYNC2 and SYNC3 consist of the same synchronizing bits and are received at later times. Thus the synchronizing word SYNC1 is transmitted for the duration of the t.d.m. frames R1 to R6, and the synchronizing word SYNC2 is transmitted for the duration of the t.d.m. frames R7 to R12. Similarly, the synchronizing word SYNC3 is also transmitted for the duration of six t.d.m. frames.

In accordance with FIG. 2, the frame pulse train TR is fed to the counter Z2 which after a total of p input pulses emits a pulse of the synchronizing signal Tp. In accordance with FIG. 3 and in accordance with a practical exemplary embodiment, with $p=6$, the individual synchronizing bits of the synchronizing words are transmitted for the duration of six consecutive t.d.m. frames. The synchronizing signal Tp is illustrated in FIG. 4 and the individual pulses thereof occur at the times 1, 2, 3, 4.

The counter Z3 must be considered as a synchronizing word counter because at its input it receives the synchronizing signal Tp and counts the pulses thereof. If it is not previously reset, it counts up to 3 and then it emits the signal Tq via its output. Each of the counters Z1, Z2, Z3 has a resetting input r and when a 1-signal is received is reset to a starting count. The trigger stage K can assume two stable states and for the duration of a 0- and 1-state in each case emits a 0- and 1-signal respectively via its output c. A transition occurs from the 0- to the 1-state whenever a 1-signal occurs at the input b. A transition from the 1- to the 0-state occurs whenever a 1-signal occurs at the input a. The signal KA is emitted via the output c of the trigger stage K.

The mode of operation of the synchronization discriminator DIS illustrated in FIG. 2 will now be described, with reference to the signals illustrated in FIG. 4, in the event that the synchronization state has already been attained. Complete synchronization is signalled by the signal $KA=1$. The decoders DC1 and DC2 constantly recognize the received synchronizing words and each emit 1-signals to the AND-gate U1, for which reason this gate also emits 1-signals provided with the same reference U1 in FIG. 4, at the times 1, 2, 3, 4. However, these 1-signals U1 are not active at the output of the AND-gate U2, because, on account of the inverter IN, a 0-signal is applied to an input of the AND-gate U2, so that the signal $SE=0$ is emitted via the output of the AND-gate U2. For the duration of the signal $SE=0$, the counters Z1 and Z2 are therefore not reset, so that no change occurs in the counting mode of these counters Z1 and Z2 and, as illustrated in FIG. 4, the synchronizing signal Tp is emitted. As the output signals from the decoder DC1 coincide with the individual pulses of the synchronizing signal Tp under the assumed conditions, at approximately the times 1, 2, 3, 4,1-signals are constantly emitted via the output of the AND-gate U3 and reset the counts of the counter Z3 so that the signal $Tq=0$ is emitted. As a 0-signal is present at the input a of the trigger stage K, no change is made in the signal $KA=1$.

In accordance with FIG. 5, the frame synchronism has not yet been established, as can be seen from the pulse, occurring at the time 5, of the synchronizing signal Tp, and as is also signalled by the alarm signal $KA=0$. However it has been assumed that at the time 6 both decoders DC1 and DC2 recognize the correct synchronizing word SYNC4 and each emit 1-signals to the AND-gate U1, so that a 1-signal is also emitted via the output of the gate U1 to the gate U2. As, with $KA=0$, a 1-signal is also present at the second input of the gate U2, via the output of the gate U2 the signal $SE=1$ is emitted which causes the counters Z1 and Z2 to be reset. Thus these counters Z1 and Z2 resume counting from the time 6, so that at this time the frame synchronism has been established. With the signal $SE=1$ at the input b of the trigger stage K, the trigger stage K is brought into its 1-state, during which it emits the signal $KA=1$. Thus from the time 6 onwards the state represented in FIG. 4 is re-established.

The monitoring of the synchronization will be described more precisely with reference to FIG. 6. It has been assumed that at the time 10 the last pulse of the signal U3 has occurred but at the times 11, 12, and 13 no further resettings of the counter Z3 are carried out as the decoder DC1 is not receiving correct synchronizing words. Pulses of the synchronizing signal Tp are in fact emitted at the times 11, 12 and 13, but at the time 13 a pulse of the signal Tq occurs which triggers the alarm signal $KA=0$.

The shift register RG represented in FIG. 2 and comprising a large number of cells can be constructed at reasonable cost employing an addressable store. In this case the individual cells of the store are addressed in such manner that the individual bits of the multiplex signal ME are stored in turn, and at the same time those storage cells in which the synchronizing bits can be stored are continuously interrogated.

The invention has been described in conjunction with a preferred embodiment thereof. It will be evident that changes may be made in this embodiment without departure from the invention. Accordingly, the invention is not to be considered limited to the described embodiment, but only by the scope of the appended claims.

I claim:

1. Process for the frame synchronization of a time division multiplex system comprising a plurality of data channels; with a multiplexer which, in respect of each t.d.m. frame makes available a total of m time slots and emits a multiplex signal; with a transmitting-end synchronizing bit generator which produces synchronizing bits which are transmitted in the frame of the multiplex signal from the transmitting-end to the receiving-end; with a receiving-end pulse generator for the production of a bit pulse train; with a receiving-end address generator for the operation of a demultiplexer and with a receiving-end synchronizing discriminator which, with the aid of the synchronizing bits, produces a synchronizing signal for the operation of the address generator, characterized by the following steps:

(a) in respect of each t.d.m. frame (R1, R2, R3) the synchronizing bit generator (SG) produces precisely one synchronizing bit (S) per t.d.m. frame and at least $p \geq 6$ consecutive synchronizing bits (S) to form a synchronizing word (100010) over p t.d.m. frames;

(b) the synchronizing bits (S) of the synchronizing bit generator (SG) are fed at the transmitting-end via a data channel to the multiplexer (MUX);

(c) at the receiving-end the multiplex signal is input in serial fashion with the bit pulse train (TB) into a register (RG) which consists of at least 2pm-m cells;

(d) each m-th cell of the register (RG) is connected to a first decoder (DC1) and second decoder (DC2), which both respond to the synchronizing word (100010) and emit a first and second decoder signal respectively, and in the event of coincidence of the first and second decoder signals a synchronization recognition signal (SE) is emitted;

(e) when synchronization has not yet been attained, the synchronization recognition signal (SE) resets the count of a counter (Z1, Z2) which, from an initial count, counts a further number of counts equal to the product of m and p and which emits the synchronizing signal (Tp) to the address generator (AE);

(f) the synchronizing signal (Tp) is fed to a synchronizing word counter (Z3) which, in the event of coincidence of the synchronizing signal (Tp) with the first decoder signal, emits a resetting signal which resets the count of the synchronizing word counter (Z3), and emits a counting signal (Tq) when a given count has been reached;

(g) the counting signal (Tq) is fed to a trigger stage (K) which is controlled with the synchronizing word recognition signal (SE) and emits an alarm signal (KA) when the first decoder signal fails to appear.

2. Circuit arrangement according to claim 1, characterized in that the outputs of the first decoder (DC1) and the second decoder (DC2) are connected to outputs of a first AND-gate (U1) whose output is connected to an input of a second AND-gate (U2); that the output of the trigger stage (K) is connected to a further input of the second AND-gate (U2); that the output of the second AND-gate (U2) is connected on the one hand to an input of the trigger stage (K) and on the other hand to a resetting input (r) of the counter (Z1, Z2).

3. Circuit arrangement according to claim 2, characterized in that the output of the first decoder (DC1) is connected to an input of a third AND-gate (U3), that the output of the counter (Z1, Z2) is connected to a second input of the third AND-gate (U3), and that the output of the third AND-gate (U3) is connected to a resetting input of the synchronizing word counter (Z3).

4. Apparatus for the frame synchronization of a time division multiplex system comprising a plurality of data channels; including a multiplexer operable to make available a total of m time slots and to emit a multiplex signal; a transmitting-end synchronizing bit generator opera to produce synchronizing bits which are transmitted in the frame of said multiplex signal from the transmitting-end to the receiving end of the multiplex system; a receiving-end pulse generator for production of a bit pulse train; a demultiplexer; a receiving-end address generator for the operation of said demultiplexer; a receiving-end synchronizing discriminator operable with the aid of said synchronizing bits to produce a synchronizing signal for the operation of said address generator; characterized by the following:

(a) said synchronizing bit generator (SG) is operable to produce precisely one synchronizing bit (S) per t.d.m. frame and at least $p \geq 6$ consecutive synchronizing bits (S) to form a synchronizing word (100010) over p t.d.m. frames;

(b) said synchronizing bit generator is operable to feed said synchronizing bits (S) to said multiplexer (MUX);

(c) a register (RG) at the receiving-end of said multiplex system for receiving said multiplex signal in serial fashion with said bit pulse train (TB) from said receiving-end pulse generator, said register having at least 2 pm-m storage cells;

(d) means including a first (DC1) and a second decoder (DC2) at said receiving end each connected to each m-th cell of said register (RG) and responsive to said synchronizing word (100010), respectively to emit a first and a second decoder signal and, upon coincidence of said first and second decoder signals, to emit a synchronization recogntion signal (SE);

(e) first counter means (Z1, Z2) receiving the synchronization signal (SE) for reset thereof; said counter means receiving also said bit pulse train and operable, when synchronization has not yet been attained, to count from the reset condition to a number of counts equal to the product of m and p and thereupon emit a synchronizing signal (Tp) to said address generator (AE);

(f) a synchronizing word counter (Z3) receiving said synchronizing signal (Tp) and operable, upon coincidence of said synchronizing signal (Tp) with said first decoder signal, to emit a resetting signal to reset the count of said word counter (Z3) and to emit a counting signal (Tq) when a predetermined count has been reached; and, (g) a trigger stage (K) receiving said counting signal (Tq) and controlled by said synchronizing word recognition signal (SE) to emit an alarm signal (KA) when said first decoder signal fails to appear.

* * * * *